United States Patent [19]
Aucsmith et al.

[11] Patent Number: 5,757,915
[45] Date of Patent: May 26, 1998

[54] PARAMETERIZED HASH FUNCTIONS FOR ACCESS CONTROL

[75] Inventors: David W. Aucsmith, Portland; Robert C. Knauerhase, Hillsboro, both of Oreg.

[73] Assignee: Intel Corporation, Santa Clara, Calif.

[21] Appl. No.: 519,307

[22] Filed: Aug. 25, 1995

[51] Int. Cl.$^6$ .................................................. H04L 9/32
[52] U.S. Cl. .................................................. 380/25; 380/4
[58] Field of Search .................................................. 380/4, 25

[56] References Cited

U.S. PATENT DOCUMENTS

| | | | |
|---|---|---|---|
| 5,052,040 | 9/1991 | Preston et al. | 380/4 |
| 5,097,504 | 3/1992 | Camion et al. | 380/23 |
| 5,224,160 | 6/1993 | Paulini et al. | 380/4 |
| 5,343,527 | 8/1994 | Moore | 380/4 |
| 5,412,718 | 5/1995 | Narasimhalu et al. | 380/4 |
| 5,530,757 | 6/1996 | Krawcyzk | 380/23 |

OTHER PUBLICATIONS

International Search Report, PCT/US96/11925, Feb. 27, 1997.

*Primary Examiner*—Gilberto Barron, Jr.
*Attorney, Agent, or Firm*—Blakely, Sokoloff, Taylor & Zafman

[57] ABSTRACT

A method and apparatus for access control in a computer system are disclosed. A storage unit receives a block of data having an encrypted executable image and a signature component. A separation unit coupled to the storage unit separates the signature component from the encrypted executable image. A decryption unit coupled to the separation unit decrypts the encrypted executable image using the signature component as a key. This yields an decrypted executable program. An identification unit coupled to the decryption unit locates an identification mark in the decrypted executable program and identifies a composite key assigned to the identification mark. A signature generation unit coupled to the identification unit performs a keyed cryptographic hash algorithm on the decrypted executable program using the composite key as a key. A verification unit coupled to the signature generation unit compares the signature component with the computed keyed cryptographic hash value to verify the source of the block of data and to determine whether it has been modified. If the signature matches the keyed cryptographic hash value, a rights assignment unit coupled to the verification unit assigns appropriate access rights to the decrypted executable program and allows it to be executed by a computer system.

12 Claims, 7 Drawing Sheets

PARAMETERIZED HASH FUNCTIONS FOR ACCESS CONTROL

FIELD OF THE INVENTION

The present invention relates to access control in a computer system. More specifically, the present invention relates to an apparatus and method for identifying the origin of an executable image and using that identification to determine the level of access rights allowed to the executable.

BACKGROUND OF THE INVENTION

Security violations on a computer systems can be categorized as being either intentional or accidental. Among the forms of intentional access are unauthorized reading of data, unauthorized modification of data, and unauthorized destruction of data. Most operating systems provide a means for processes to spawn other processes. In such an environment, it is possible to create a situation where operating-system resources and user files are misused. Worms and viruses are two common methods of misuse. The protection of a computer system depends on its ability to identify the source of the programs that are to be executed and to verify that these programs have not been modified in a way such that then may pose a security threat to the system.

In addition to verifying the authenticity of the source of a program, there is also a need to ensure that the files, memory segments, CPU, and other resources of a computer system can be utilized only by those processes that have gained proper authorization from the operating system. There are several reasons for providing this protection. The most obvious is the need to prevent mischievous, intentional violation of an access restriction. Of more general importance is the need to ensure that each program component active in a system uses system resources in ways consistent with the stated policies for the uses of these resources. Protection can improve the reliability by detecting latent errors at the interfaces between component subsystems. Early detection of interface errors can prevent contamination of a healthy subsystem by another subsystem that is malfunctioning.

A process typically operates within a protection domain. The domain specifies the resources that the process may access. Each domain defines a set of objects and the types of operations that may be invoked on each object. The ability to execute an operation on an object is an access right. A domain is a collection of access rights, each of which is typically an ordered pair: <object-name, rights-set>. For example, if domain D has the access right <file F, {read, write}>, then a process executing in domain D can both read and write file F. It should not, however, be allowed to perform any other operation on that object. Domains may be disjoint or they may share access rights. The association between a process and a domain may also be either static or dynamic. Thus, it is important to restrict the protection domains accessible to each process.

Thus, what is needed is an apparatus and method for providing an forgeable signature of an executable image that can be used to identify the origin of the executable image, whether there has been any modification to the executable, and the level of access rights or trust the executable should be allowed by the operating system.

SUMMARY OF THE INVENTION

A method and apparatus for access control in a computer system is disclosed. One embodiment of the access controller comprises a storage unit. The storage unit stores a block of data having a signature component and a encrypted executable image. A separation unit is coupled to the storage unit. The separation unit receives the block of data and separates the signature component from the encrypted executable image. A decryption unit is coupled to the separation unit. The decryption unit receives the encrypted executable image and decrypts the encrypted executable image into an executable program. This can be achieved by running a decryption algorithm which uses the signature component as a key to decrypt the encrypted executable image. An identification unit is coupled to the decryption unit. The identification unit receives the executable program to be used and identifies a key designated to an identification mark in the executable program for computing a cryptographic keyed hash value of the executable program. A signature generation unit is coupled to the decryption unit. The signature generation unit receives the executable program and computes a cryptographic keyed hash value to the executable program using a stored key identified by the identification unit. A verification unit is coupled to the hash unit. The verification unit compares the keyed hash value with the signature component to verify the source of the block of data and that no modification has been made to the block of data. A rights assignment unit is coupled to the hash unit. The rights assignment unit receives the key used for computing the keyed hash value of the executable program and assigns rights to the executable program according to rights associated with the key.

A second embodiment of the present invention discloses a method for access control in a computer system. First, a block of data having a signature component and an encrypted executable image is received. After the block of data is received, the signature component is separated from the encrypted executable image. Next, the executable image is decrypted by executing a decryption algorithm which uses the signature component as a key. A composite key corresponding to an identification mark in the executable program is identified. The composite key is used to compute a keyed hash value of the executable program. After the keyed hash value is computed, the keyed hash value is compared with the signature component to verify the source of the block of data. Rights are assigned to the executable program according to rights preassigned to the key.

BRIEF DESCRIPTION OF THE DRAWINGS

The present invention will be understood more fully from the detailed description given below and the accompanied drawings of the various features and elements embodied in the invention. The description and drawings are not meant to limit the invention to the specific embodiment. They are provided for explanation and understanding.

DETAILED DESCRIPTION

A novel access controller unit is described. In the following detailed description, numerous specific details are set forth in order to provide a thorough understanding of the present invention. However, it will be understood by those skilled in the art that the present invention may be practiced without these specific details. In other instances, well-known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is conceived to be a self-consistent sequence of steps leading to a desired result. The steps are those requiring physical manipulations of physical quantities. Usually, though not necessarily, these quantities are electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system or similar electronic computing device that manipulates and transforms data represented as physical (electronic) quantities within the computer system's registers and memories into other data similarly represented as physical quantities within the computer system memories or registers or other such information storage, transmission or display devices.

Figure 1:
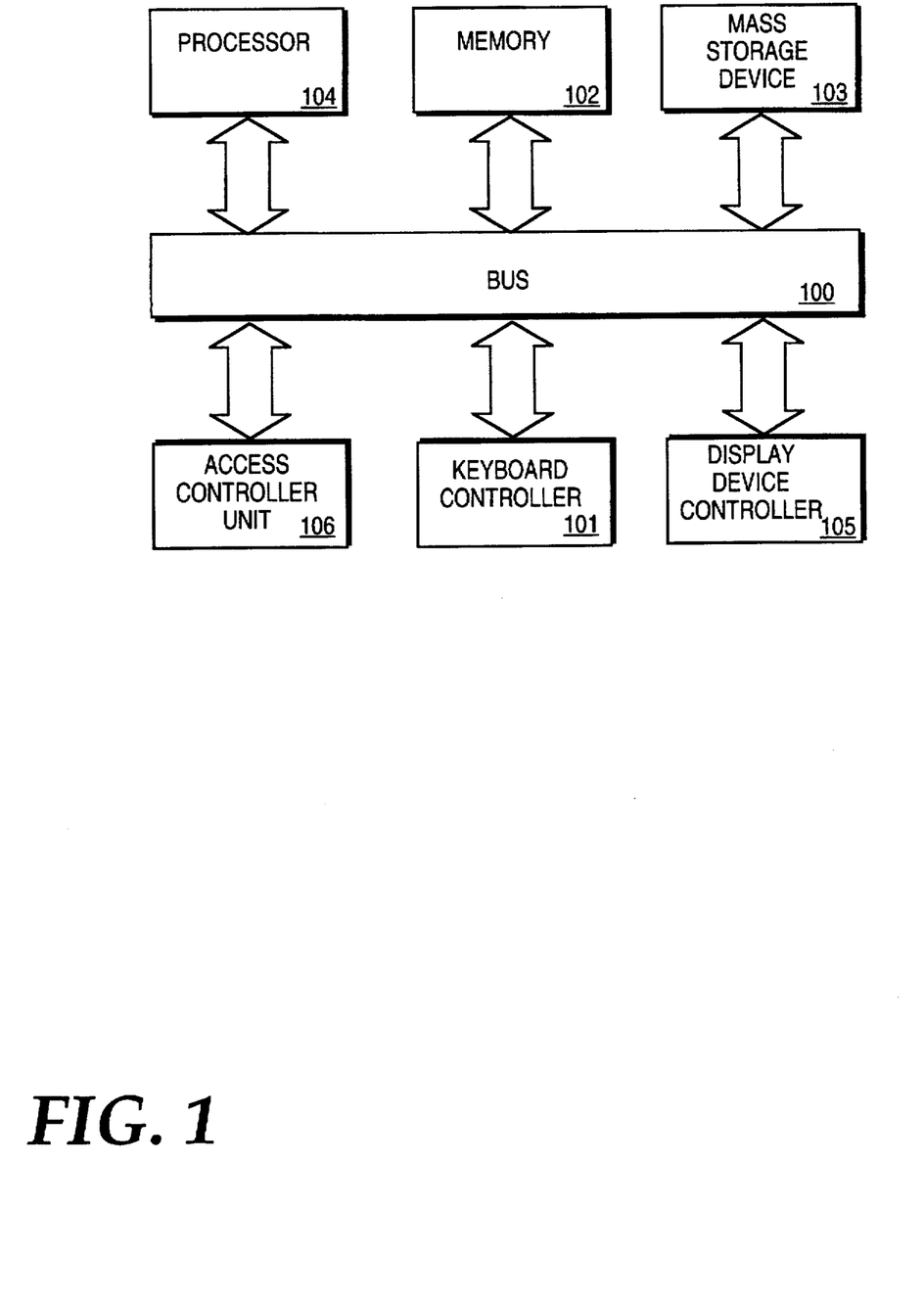
FIG. 1 illustrates one embodiment of a access controller implemented in a computer system.

FIG. 1 illustrates in block diagram form a computer system of one embodiment of the present invention. The computer system comprises bus 100, keyboard interface 101, external memory 102, mass storage device 103, processor 104 and display device controller 105. Bus 100 is coupled to display device controller 105, keyboard interface 101, microprocessor 104, memory 102 and mass storage device 103. Display device controller 105 can be coupled to a display device. Keyboard interface 101 can be coupled to a keyboard.

Bus 100 can be a single bus or a combination of multiple buses. As an example, bus 100 can comprise an Industry Standard Architectural (ISA) bus, an Extended Industry Standard Architecture (EISA) bus, a system bus, a X-bus, PS/2 bus, a Peripheral Components Interconnect (PCI) bus, a Personal Computer Memory Card International Association (PCMCIA) bus or other buses. Bus 100 can also comprise a combination of any of these buses. Bus 100 provides communication links between components in the computer system. Keyboard interface 101 can be a keyboard controller or other keyboard interface. Keyboard interface 101 can be a dedicated device or can reside in another device such as a bus controller or other controller. Keyboard interface 101 allows coupling of a keyboard to the computer system and transmits signals from a keyboard to the computer system. External memory 102 can comprise a dynamic random access memory (DRAM) device, a static random access memory (SRAM) device, or other memory devices. External memory 102 stores information and data from mass storage device 103 and processor 104 for use by processor 104. Mass storage device 103 can be a hard disk drive, a floppy disk drive, a CD-ROM device, a flash memory device or other mass storage device. Mass storage device 103 provides information and data to external memory 102.

Processor 104 processes information and data from external memory 102 and stores information and data into external memory 102. Processor 104 also receives signals from keyboard controller 101 and transmits information and data to display device controller 105 for display on a display device. Processor 104 also transmits video images to the display controller for display on a display device. Processor 104 can be a complex instruction set computing (CISC) microprocessor, a reduced instruction set computing (RISC) microprocessor, a very long instruction word (VLIW) microprocessor or other processor device. Display device controller 105 allows coupling of a display device to the computer system and acts as an interface between the display device and the computer system. Display device controller 105 can be a monochrome display adapter (MDA) card, a color graphics adapter (CGA) card, enhanced graphics adapter (EGA) card, multi-color graphics array (MCGA) card, video graphics array (VGA) card, extended graphics array (XGA) card or other display device controller. The display device can be a television set, a computer monitor, a flat panel display or other display device. The display device receives information and data from processor 104 through display device controller 105 and displays the information and data to the user of the computer system.

The computer system also comprises access controller unit 106. Access controller unit 106 is coupled to bus 100. A set of keys that are associated with access rights within the computer system are stored in access controller unit 106. Each key defines the domain that a program operates in. The keys also define one or more composite keys which are used as parameters in a cryptographic hash function for generating a program signature. The program signature is further used as a encryption key for encrypting the executable program.

Access controller unit 106 receives a process to be run by processor 104 from mass storage device 103 or another I/O device coupled to bus 100. The process comprises an encrypted executable image and a signature component. Before the computer system executes a program, the access controller unit 106 verifies that the signature of the program is legally constructed from a known composite key. By checking the signature component of the process, the access controller unit 106 identifies the origin of the process, verifies that the process has not been modified in a way that is threatening to the computer system, and determines the level of access the operating system should grant the process. The access controller unit 106 then allows the executable program to execute with the rights assigned to the keys used in deriving the composite key.

Figure 2:
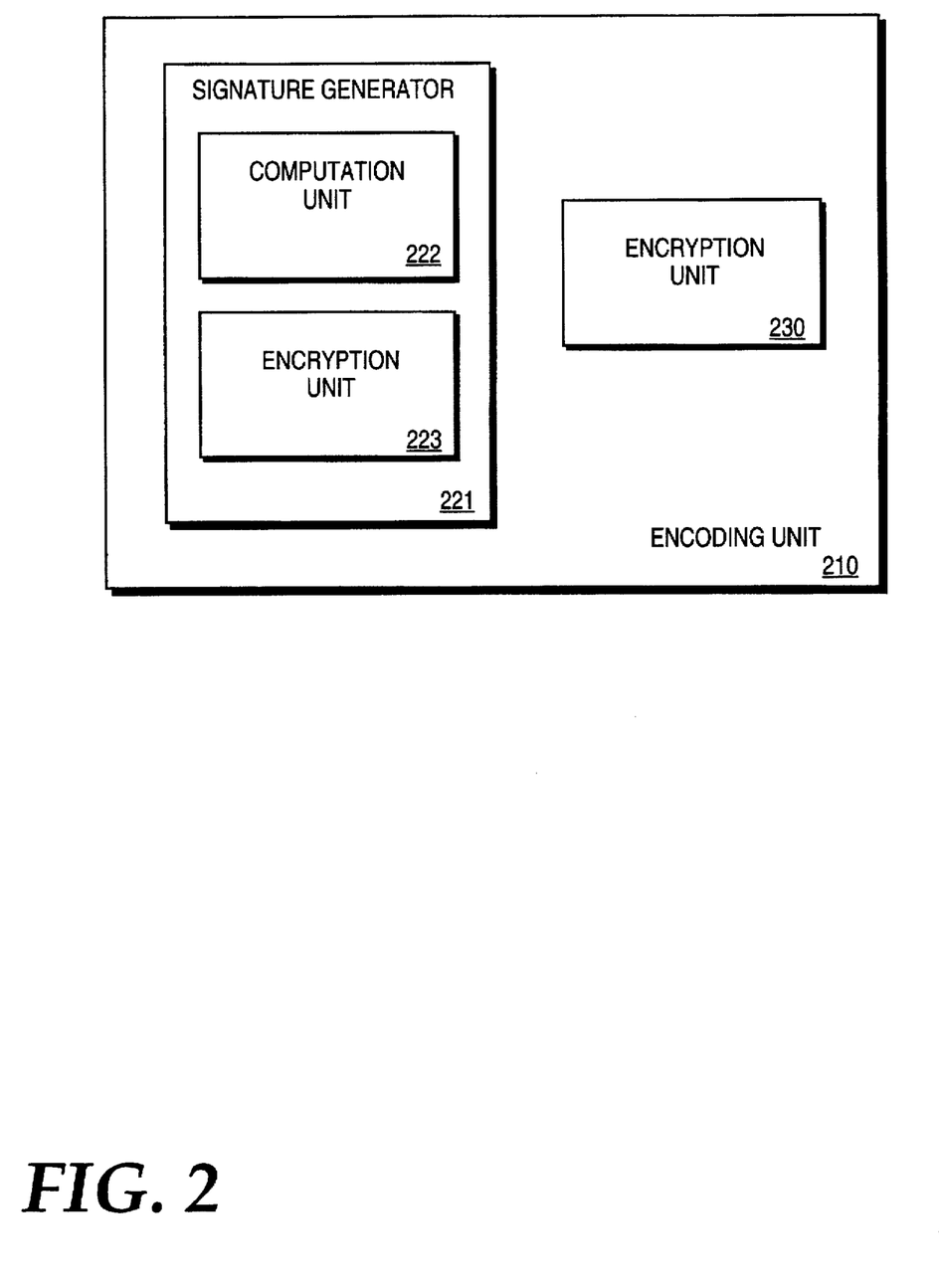
FIG. 2 illustrates a block diagram of one embodiment of an encoding unit of the present invention.

FIG. 2 illustrates a block diagram of one embodiment of a file encoding unit of the present invention. File encoding unit 210 comprises signature generator 221 and encryption unit 230. Signature generator 221 operates to create a signature of an executable program to be executed by processor 104. Encryption unit 230 encrypts the file containing the executable program using the signature as a key. Signature generator 221 performs a cryptographic keyed hash function on the plain text of an executable program, generating cipher text. Signature generator 221 uses keys which are composite keys of keys stored in access control unit 106. Each of the composite keys used in the cryptographic hash function are associated with a set of access rights. These rights are assigned to the executable program prior to execution.

Signature generator 221 comprises computation unit 222 and encryption unit 223. Signature generator 221 can use computation unit 222 and encryption unit 223 to perform any number of cryptographic keyed hash functions or encryption algorithms on the plain text of the executable program. The keys can be either private symmetric-keys or public asymmetric-keys. The difference is the extent of protection required by the operating system's copy of the key. Signature generator 221 can use such conventional algorithms as Lucifer, Madryga, NewDES, FEAL, REDOC, LOKI, Khufu, Khafre or IDEA to generate a cryptographic keyed hash value for the executable program. In one embodiment of the present invention, computation unit 222 and encryption unit 223 uses the Data Encryption Standard (DES) Cipher Block Chaining (CBC) to generate a cryptographic keyed hash value for the executable program.

Figure 3:
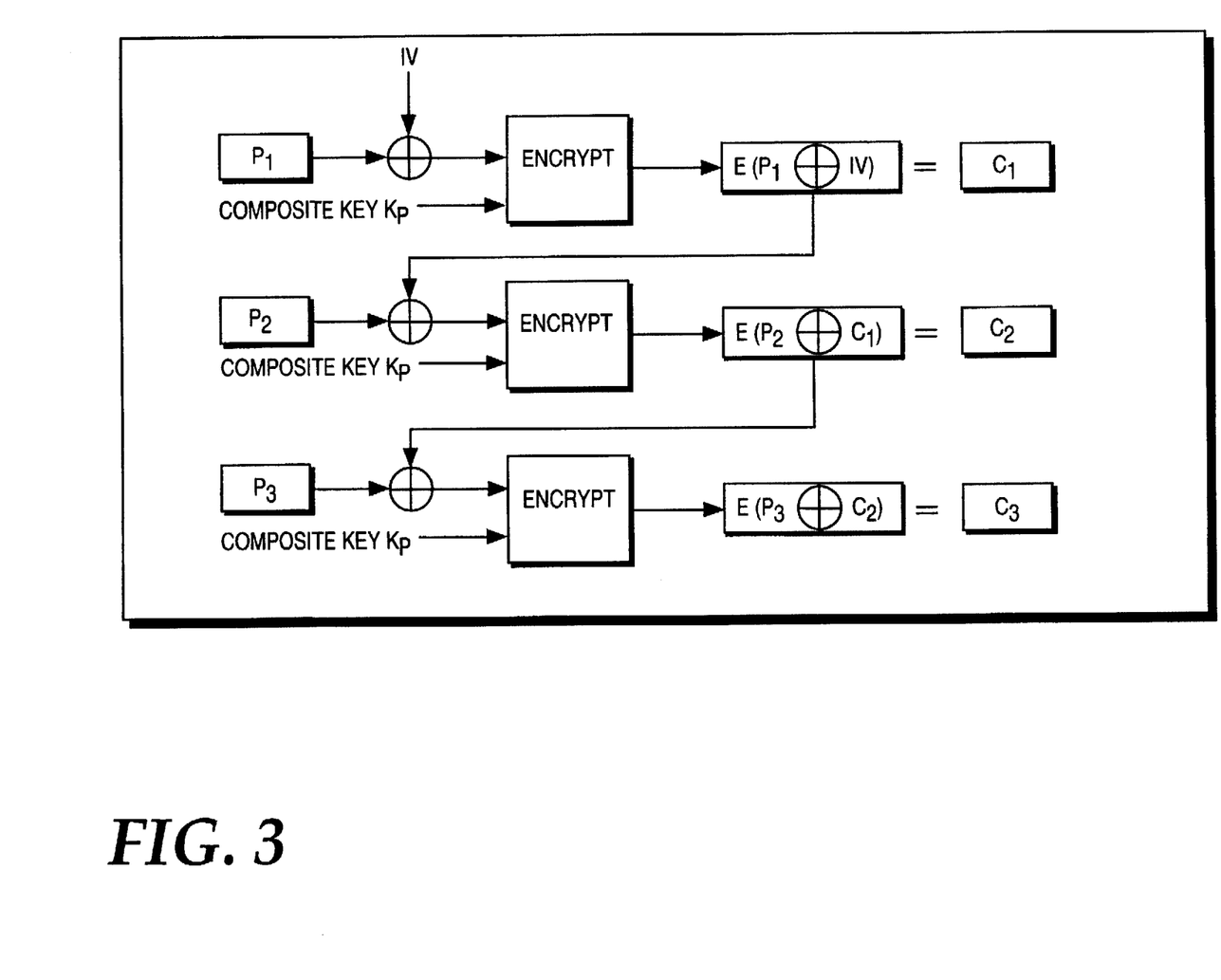
FIG. 3 illustrates how a message is encoded using an encoding unit of the present invention.

FIG. 3 illustrates the steps taken by computation unit 222 and encryption unit 223 when it uses CBC to generate a keyed hash value for the executable program. Chaining uses a feedback mechanism. The results of the encryption of previous blocks are fed back into the encryption of the current block. In other words, the previous block is used to modify the encryption of the next block. Each ciphertext block is dependent on both the plaintext block that generated it and the previous plaintext blocks. In CBC, the plaintext is XORed with the previous ciphertext block before it is encrypted.

In this example, encoding unit 210 receives a file containing an executable program with a size of 24 bytes. The signature generator 221 breaks the 24 byte file into three 8 byte sections. The first 8 bytes of plain text is represented as P1 in block 301. P1 is XORed with an initiation vector (IV) stored in the computation unit 222. This yields a first product. The initiation vector is a function of a first composite key associated with a set of access rights to be assigned to the executable program. After P1 is XORed with IV, the encryption unit 223 performs a keyed encryption algorithm using a second composite key on the first product, yielding an encrypted first product, $C_1$. The keyed encryption algorithm can be one of a variety of different keyed encryption algorithms, including any of the keyed encryption algorithms listed earlier. Computation unit 222 XORs the encrypted first product with the second 8 byte section, represented as P2, to yield a second 8 byte product. Encryption unit 223 performs a keyed encryption algorithm using the second composite key on the second product, yielding an encrypted second product, $C_2$. Computation unit 222 XORs the encrypted second product with the third 8 byte section to yield a third 8 byte product. Encryption unit 223 performs a keyed encryption algorithm using the second composite key on the third product. This yields a third encrypted product, $C_3$, which is used as a signature of the executable program.

Signature generation unit 221 generates a signature of the executable program that is a function of all the characters in the file. Thus, if the executable program is modified, one would be able to detect the modification by recomputing the cryptographic keyed hash value and comparing the recomputed value with the original signature.

Encryption unit 230 operates to encrypt the executable program by performing an encryption algorithm using the signature created from the keyed cryptographic hash algorithm as a key. This yields an encrypted executable image. The encryption of the executable program provides an additional level of protection to prevent an unauthorized third party from reading the executable program. Any variety of encryption algorithms can be used by encryption unit 230. Both the encrypted executable image and the signature are sent as a file to a computer system to be executed.

Figure 4:
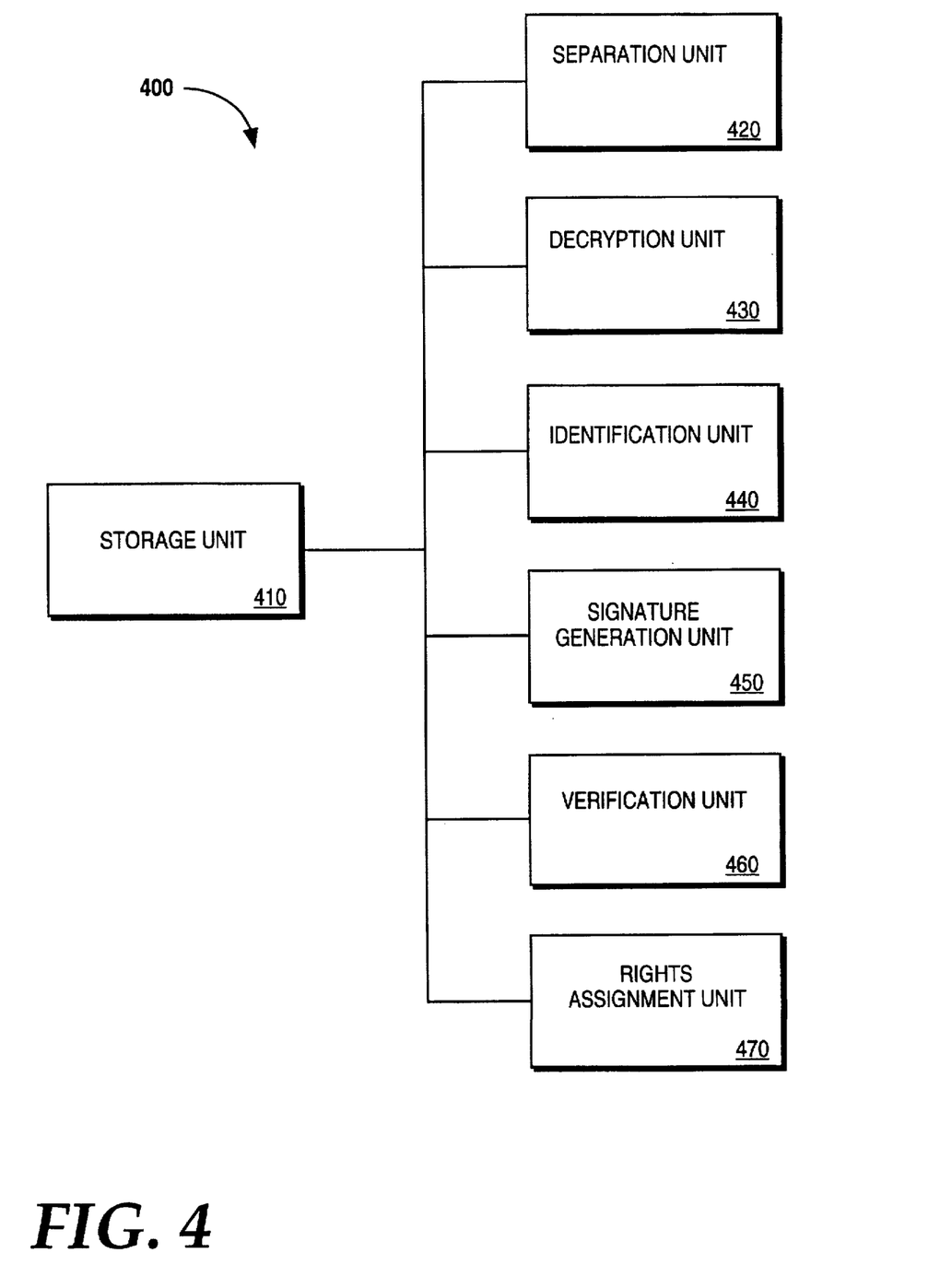
FIG. 4 illustrates a block diagram of a second embodiment of an access controller of the present invention.

FIG. 4 illustrates a block diagram of a second embodiment of an access controller of the present invention. Access control unit 400 comprises storage unit 410, separation unit 420, decryption unit 430, identification unit 440, signature generation unit 450, verification unit 460, and rights assignment unit 470.

Storage unit 410 receives a block of data comprising an encrypted executable image and a signature component. Storage unit 410 can comprise a DRAM device, a SRAM device or other memory devices. Storage unit 410 uses a pointer to indicate to the computer system whether the file stored is an executable image or an executable program. The pointer indicates to the computer system that storage unit 410 is being used as temporary storage when the file stored is an executable image. The pointer indicates to the computer system that storage unit 410 is being used as executable space when the file is an executable program.

Separation unit 420 is coupled to storage unit 410. Separation unit 420 receives the block of data from the storage unit 410 and separates the encrypted executable image from the signature component. This allows access control unit 400 to process the encrypted executable image and the signature component separately.

Decryption unit 430 is coupled to separation unit 420 and storage unit 410. Decryption unit 430 receives the encrypted executable image in cipher text form and the signature component from separation unit 420. Decryption unit 430 decrypts the encrypted executable image using the signature component as the decryption key. Decryption unit 430 transforms the encrypted executable image into an decrypted executable program.

Identification unit 440 is coupled to decryption unit 430 and storage unit 410. Identification unit 440 receives the executable program from the decryption unit 430. Identification unit 440 reads an identification mark in the executable program and obtains the identity of a corresponding composite key which is assigned to the identification mark. This composite key is typically the same key used by signature generation unit 221 to generate the keyed hash value of the executable program. In one embodiment of the present invention, identification processor 440 contains a look-up table matching various identification marks with various composite keys. The composite key is associated with specific access rights that are granted to the executable program.

Signature generation unit 450 is coupled to identification unit 440 and storage unit 410. Signature generation unit 450 receives the identity of the composite key assigned to the identification mark of the executable program. Signature generation unit 450 operates to compute a cryptographic keyed hash value of the decrypted executable program received by identification unit 440 using the identity of the composite key received by identification unit 440. Signature generation unit 450 stores a plurality of keys which are assigned specific access rights to the computer system. These keys derive a plurality of composite keys which are used to encode and decode executable programs and decrypted executable programs.

Verification unit 460 is coupled to signature generation unit 450 and storage unit 410. Comparison unit 460 receives the signature component of the executable image from the storage unit 410 and the keyed hash value of the decrypted executable program from signature generation unit 450. Verification unit 460 compares the keyed hash value of the decrypted executable program with the signature component of the executable image. If the two are the same, verification unit 460 allows the decrypted executable program to be executed by the computer system. If the two are not the same, verification unit 460 realizes that the executable image has been modified and should not be executed by the computer system.

In one embodiment of the present invention, signature generation unit 450 does not receive the identity of a composite key used to compute a keyed hash function of the decrypted executable program. Instead, signature generation unit 450 calculates several keyed hash values of the decrypted executable program using composite keys derived by permutations of stored keys in signature generation unit 450. These keyed hash values are received by verification unit 460 which determines whether any of the keyed hash values match the original signature component. Similarly, if there is a match between the signature component of the executable image and any of the computed keyed hash values of the decrypted executable program, verification unit 460 allows the decrypted executable program to be executed by the computer system. If there are no matches, verification unit 460 realizes that the executable image has been modified and should not be executed by the computer system.

Rights assignment unit 470 is coupled to verification unit 460 and storage unit 410. Rights assignment unit 470 receives the identity of the composite key used for computing the matching keyed hash value to the signature component of the executable image. When rights assignment unit 470 receives a signal from verification unit 460 indicating that the decrypted executable program is to be executed by the computer system, rights assignment unit 470 operates to assign rights which are available to the program by identifying the rights associated to the specific composite keys used for calculating the matching keyed hash value. In one embodiment of the present invention, rights assignment unit 470 can contain a look-up table matching various composite keys with various levels of access rights. After rights assignment unit 470 assigns the appropriate rights to decrypted executable program, rights assignment unit 470 moves the pointer in storage unit 410 to indicate to the computer system that storage unit 410 is being used as executable space. The computer system will realize that storage unit 410 contains an executable program and will proceed to execute the executable program.

Figure 5:
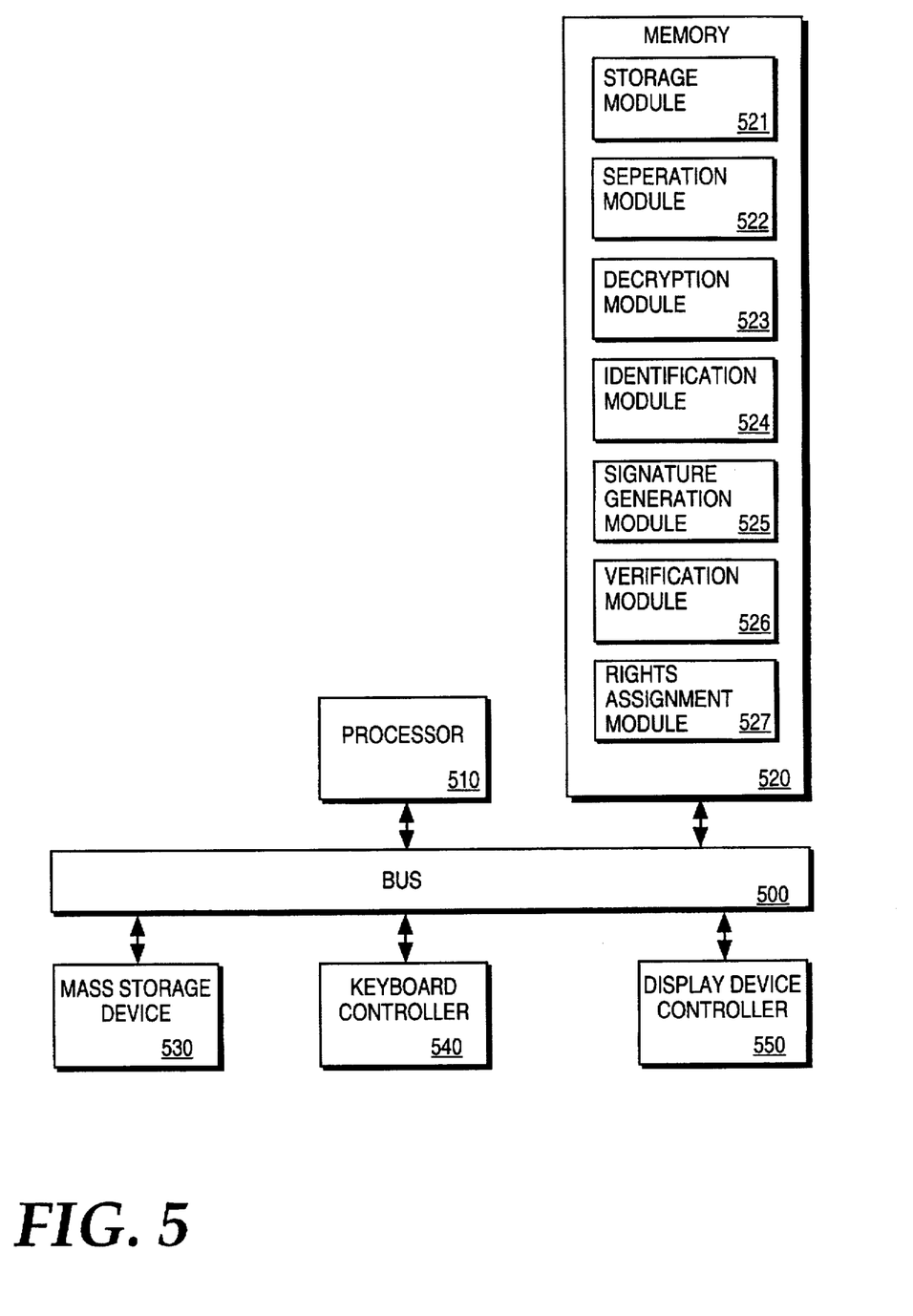
FIG. 5 illustrates a block diagram of a third embodiment of the video processing system of the present invention.

FIG. 5 illustrates in block diagram form a typical computer system of a fourth embodiment of the present invention. The computer system comprises bus 500, microprocessor 510, memory 520, data storage device 530, keyboard controller 540, and display device controller 550.

Microprocessor 510 can be a complex instruction set computing (CISC) microprocessor, a reduced instruction set computing (RISC) microprocessor or other processor device. Microprocessor executes instructions or code stored in memory 520 and performs operations on data stored in memory 520. Computer system 500 further comprises a data storage device 530 such as a hard, floppy, or optical disk drive which is coupled to bus 515. Display device controller 550 is also coupled to bus 515. Display device controller 550 allows coupling of a display device to the computer system. Keyboard controller 540 allows coupling of a keyboard to the computer system and transmits signals from a keyboard to the computer system.

Memory 520 is coupled to the microprocessor 510 through bus 500. Memory 520 can be a dynamic random access memory (DRAM), static random access memory (SRAM) or other memory device. Memory 520 can store instruction or code executable by processor 510 that are part of application programs, operating system programs or other computer programs. Memory 520 comprises storage module 521, separation module 522, decryption module 523, identification module 524, signature generation module 525, verification module 526, and rights assignment module 527. Storage module 521 comprises a first plurality of processor executable instructions that are executed by processor 510 in the manner shown in FIG. 7. Storage module performs functions similar to that of storage unit 410 in FIG. 4. Separation module 522 comprises a second plurality of processor executable instructions that are executed by processor 510 in the manner shown in FIG. 7. Separation module 522 performs functions similar to that of separation unit 420 in FIG. 4. Decryption module 523 comprises a third plurality of processor executable instructions that are executed by processor 510 in the manner shown in FIG. 7. Decryption module 523 performs functions similar to that of decryption unit 430 in FIG. 4. Identification module 524 comprises a fourth plurality of processor executable instructions that are executed by processor 510 in the manner shown in FIG. 7. Identification module 524 functions similarly to the identification unit 440 in FIG. 4. Signature generation module 525 comprises a fifth plurality of processor executable instructions that are executed by processor 510 in the manner shown in FIG. 7. Signature generation module 525 performs functions similar to that of signature generation unit 450 in FIG. 4. Verification module 526 comprises a sixth plurality of processor executable instructions that are executed by processor 510 in the manner shown in FIG. 7. Verification module 526 performs functions similar to that of verification unit 460 in FIG. 4. Rights assignment module 527 comprises a seventh plurality of processor executable instructions that are executed by processor 510 in the manner shown in FIG. 7. Rights assignment module 527 functions similarly to the rights assignment unit 470 in FIG. 4.

Figure 6:
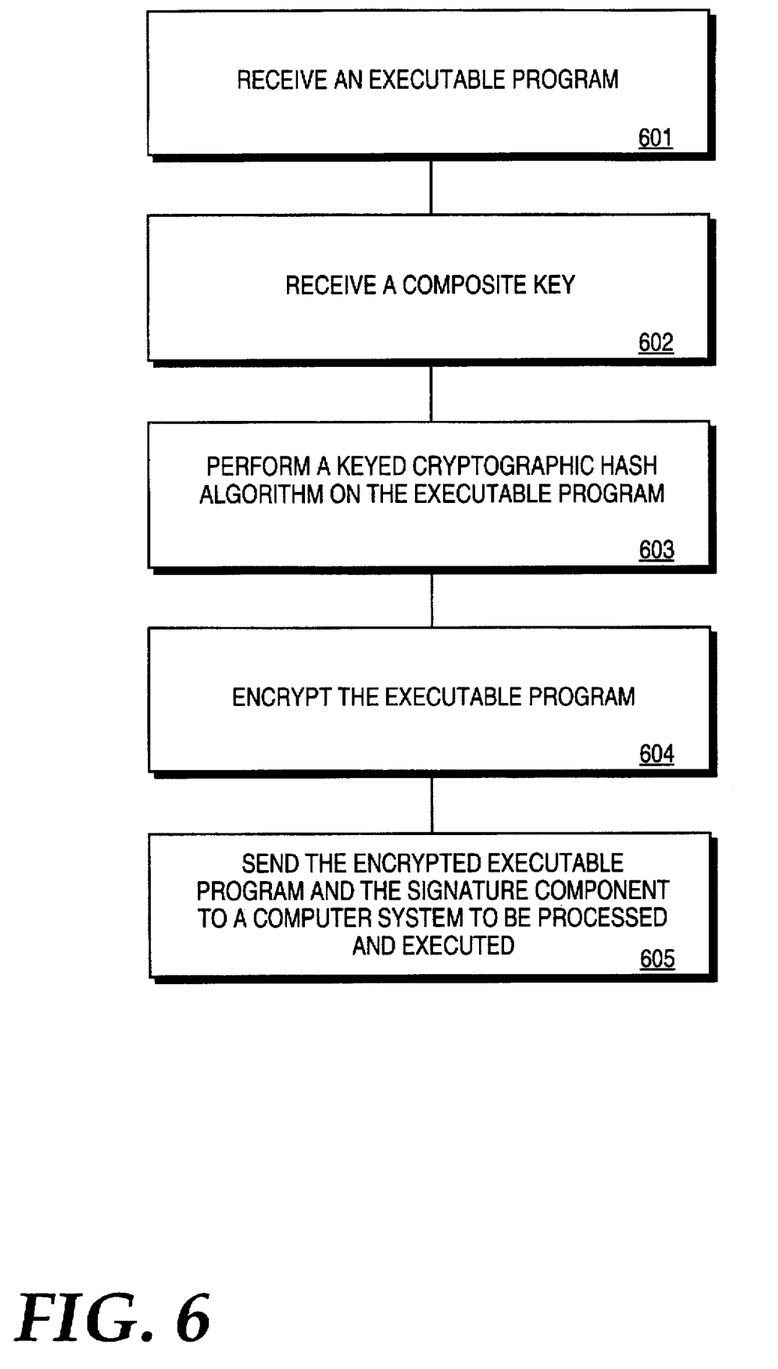
FIG. 6 is a flow chart illustrating a method for encoding.

FIG. 6 is a flow chart illustrating a method for encoding an executable program to be executed by a computer system. First, receive an executable program as shown in block 601. Next, receive a composite key which defines associated rights to be assigned to the executable program as shown in block 602. Perform a keyed cryptographic hash algorithm on the executable program. The composite key used can be either a private symmetric-keys or public asymmetric-keys. This yields a encrypted keyed hash value which serves as a signature or a fingerprint for the executable program. This is shown in block 603.

Next, encrypt the executable program using the encrypted keyed hash value as a key. This yields an executable image. This is shown in block 604. After the executable program is encrypted to an executable image, send both the executable image and the signature component to a computer system to be processed and executed. This is shown in block 605.

Figure 7:
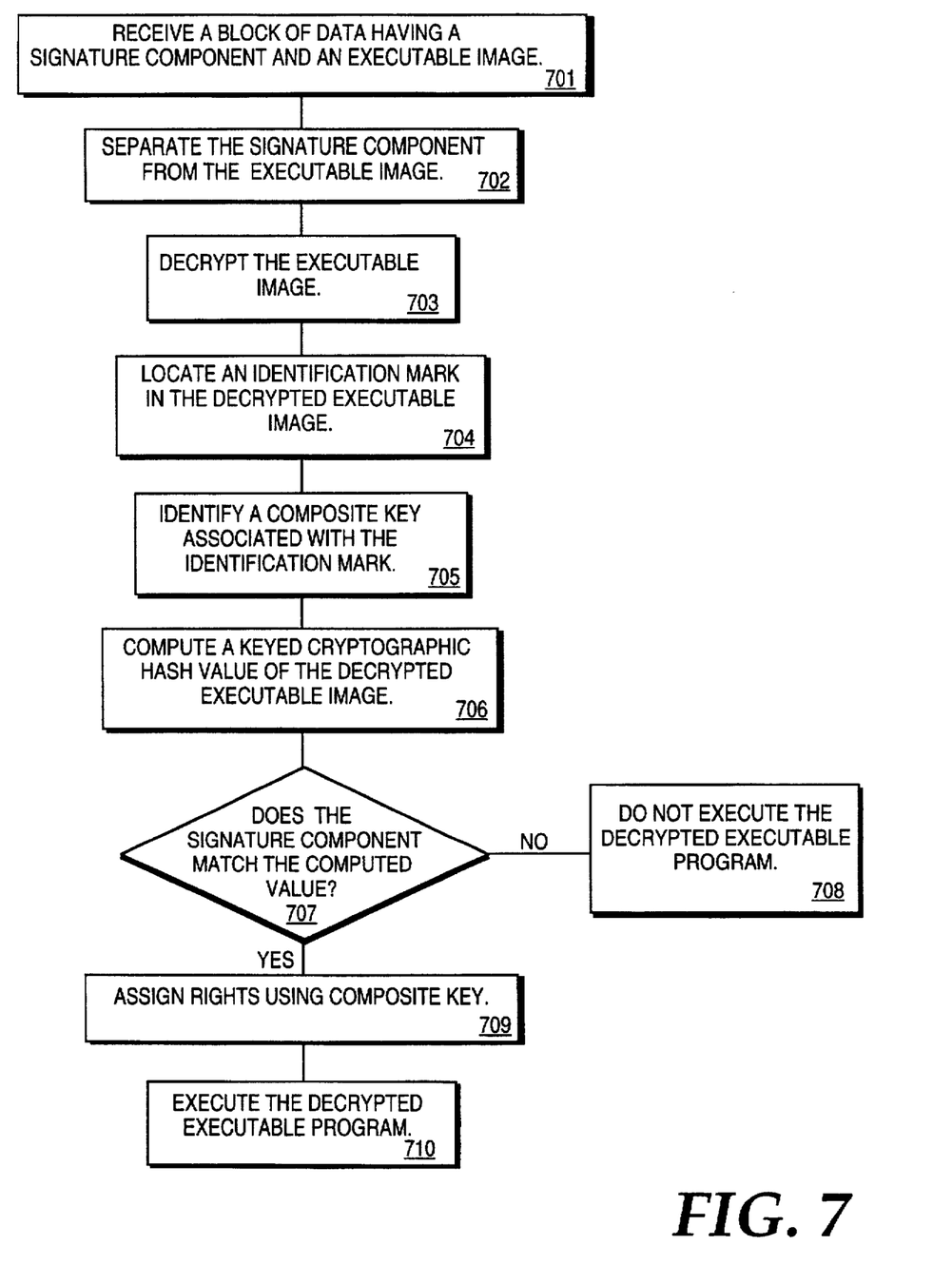
FIG. 7 is a flow chart illustrating a method for access control of a computer system.

FIG. 7 is a flow chart illustrating a method for access control in a computer system. First, receive a block of data having a signature component and an executable image as shown in block 701. Separate the signature component from the executable image as shown in block 702. Decrypt the executable image using the signature component as the key. This yields a decrypted executable program. This is shown in block 703.

Next, locate an identification mark in the decrypted executable program as shown in block 704. Identify a composite key associated with the identification mark. This is shown in block 705. Compute a keyed cryptographic hash value of the decrypted executable program using the composite key associated with the identification mark as shown in block 706. Next, verify the source of the block of data and whether the block has been modified by comparing the signature component in the block of data with the computed keyed cryptographic hash value for the decrypted executable program. This is shown in block 707. If the signature component in the block of data does not match that of the computed keyed cryptographic hash value, do not execute the decrypted executable program. This is shown in block 708. If the signature component in the block of data does match that of the computed keyed cryptographic hash value, assign the appropriate rights to the decrypted executable program as identified by the composite key. This is shown in block 709. Lastly, execute the decrypted executable program as shown in block 710.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be limiting. Therefore, references to details of particular embodiments are not intended to limit the scope of the claims which in themselves recite only those features regarded as essential to the invention.

What is claimed is:

1. A method for generating an encoded executable image, comprising:

performing a cryptographic keyed hash function on an executable program to generate a signature component using a first key having an associated set of access rights assigned to the executable program; and performing an encryption algorithm on the executable program using the signature component as a second key.

2. The method of claim 1, wherein performing the cryptographic keyed hash function comprises performing a data encryption standard cipher block chaining algorithm.

3. A method for access control, comprising separating a signature component from an executable image in a block of data;

decrypting the executable image into a executable program using the signature component;

computing a cryptographic keyed hash value of the executable program using a key;

verifying a source of the block of data by comparing the signature component with the cryptographic keyed hash value.

4. The method of claim 3 further comprising:

finding an identification mark in the executable program; and looking up the key corresponding to the identification mark for performing a cryptographic keyed hash function on the executable program.

5. The method of claim 3 further comprising assigning rights to the executable program according to rights associated with the key.

6. A device for encoding an executable program, comprising:

a signature generation unit that performs a cryptographic keyed hash function on an executable program to generate a signature component using a first key having an associated set of access rights assigned to the executable program; and a first encryption unit, coupled to the signature generation unit, that encrypts the executable program using the signature component as a second key.

7. The device of claim 6, wherein the signature generation unit further comprises a computation unit and a second encryption unit that performs a data encryption standard cipher block chaining algorithm.

8. An access controller, comprising:

a separation unit that separates a signature component, derived from performing a keyed hash function on a first executable program, from an encrypted executable image in a block of data;

a decryption unit, coupled to the separation unit, the decrypts the encrypted executable image into a second executable program with the signature component;

a signature generation unit, coupled to the decryption unit, that computes a cryptographic keyed hash value of the second executable program using a key; and a verification unit, coupled to the signature generation unit, that compares the cryptographic keyed hash value with the signature component.

9. The access controller of claim 8, wherein the signature generation unit further comprises a key storage component that stores the key utilized by the signature generation unit.

10. The access controller of claim 8 further comprising an identification unit, coupled to the decryption unit, that identifies the key designated to an identification mark in the executable program for computing the cryptographic hash value of the second executable program.

11. The access controller of claim 8 further comprising a rights assignment unit, coupled to the signature generation unit, that assigns rights to the second executable program according to rights associated with the key.

12. A computer system, comprising:

a bus;

a memory, coupled to the bus; and a separation unit that separates a signature component from an encrypted executable image in a block of data, a decryption unit, coupled to the separation unit, the decrypts the encrypted executable image into an executable program with the signature component, a signature generation unit, coupled to the decryption unit, that computes a cryptographic keyed hash value of the executable program using a key, and a verification unit, coupled to the signature generation unit, that compares the cryptographic keyed hash value with the signature component.

* * * * *

UNITED STATES PATENT AND TRADEMARK OFFICE
CERTIFICATE OF CORRECTION

PATENT NO.    : 5,757,915
DATED         : May 26, 1998
INVENTOR(S)   : Aucsmith et al.

It is certified that error appears in the above-identified patent and that said Letters Patent is hereby corrected as shown below:

Column 10,
Line 26, after "separation unit,", delete "the", insert -- that --.
Line 53, after "separation unit,", delete "the", insert -- that --.

Signed and Sealed this

Fourth Day of June, 2002

*Attest:*

*Attesting Officer*

JAMES E. ROGAN
*Director of the United States Patent and Trademark Office*